Feb. 20, 1951     R. D. WEBER     2,542,442
TUBE SUPPORT
Filed July 23, 1945
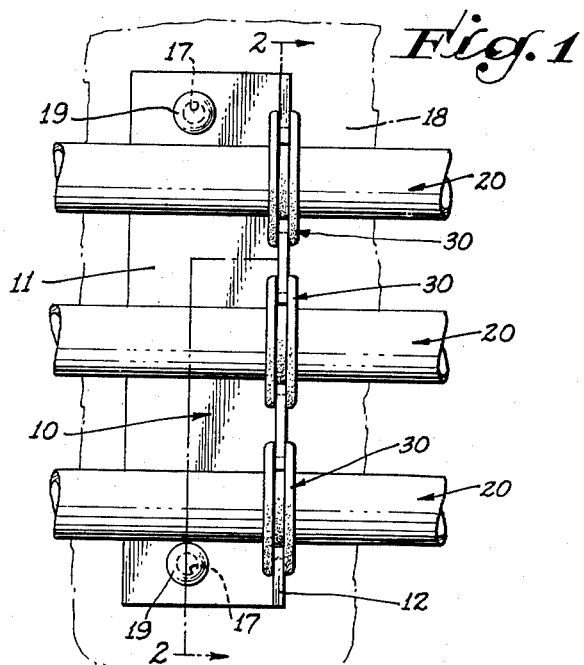
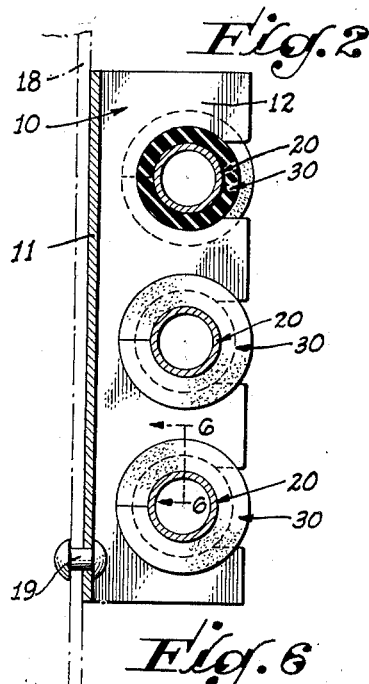
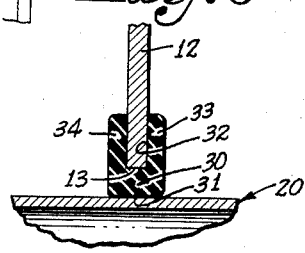
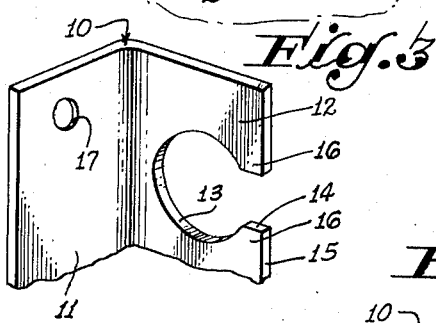
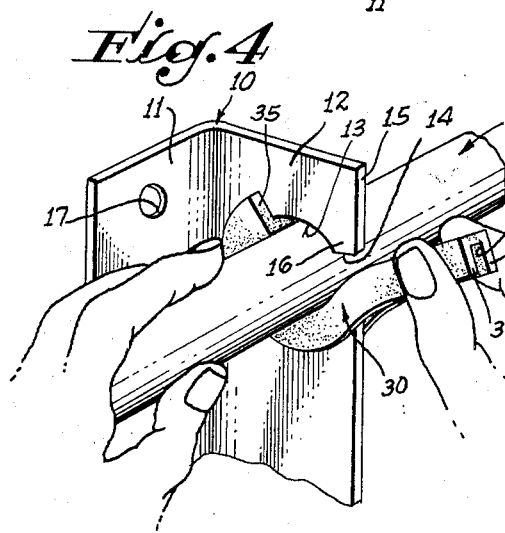
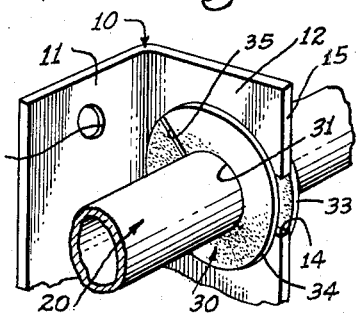
INVENTOR
ROBERT D. WEBER
BY
HARRIS, KIECH, FOSTER & HARRIS
FOR THE FIRM
ATTORNEYS Patented Feb. 20, 1951

2,542,442

UNITED STATES PATENT OFFICE 2,542,442

TUBE SUPPORT

Robert D. Weber, Culver City, Calif., assignor to Hughes Tool Company, Houston, Tex., a corporation of Delaware Application July 23, 1945, Serial No. 606,500

4 Claims. (Cl. 248—68)

My invention relates to a means for supporting elongated members of a tubular or rod-like nature and a primary objective of the invention is the provision of a device of this general character which is particularly adapted for maintaining the position of a plurality of adjacent tubular hydraulic lines while permitting separate and independent installation and removal of any one line or any combination thereof without displacing or interfering with the function of any of the remaining lines.

Artisans and technicians familiar with the field of hydraulics will appreciate the universality of application of fluid means for effecting the realization of a multitude of diversified objectives. The employment of fluid systems frequently dictates the installation of a profusion of hydraulic lines or tubes for conducting the various fluids to their respective destinations and many installations necessitate the application of a high degree of ingenuity to achieve a logical and orderly arrangement of the fluid lines which will occupy a minimum amount of space while permitting ready accessibility to any individual tube. Perhaps one of the most efficient arrangements is one wherein the various hydraulic tubes are disposed in mutually parallel relationship adjacent a wall or other similar surface, the spaces between the respective hydraulic lines and between the lines and the wall being as small as possible consistent with the requirements of accessibility.

The hydraulic systems of aircraft provide a graphic illustration of these principles. Modern aircraft design demands the efficient utilization of all available space and imposes the additional consideration of achieving space conservation without incurring a weight increase. The conventional airplane relies upon fluid means for effecting operation of many of the movable components thereof and consequently the efficient and orderly distribution and support of the maze of hydraulic lines directed through the limited space available in the fuselage and wing structures presents a difficult problem. Insofar as possible, the various lines are disposed in closely-spaced, mutually parallel relationship adjacent the surface of a component of the aircraft structure and are supported by the structure at intervals consistent with structural and vibrational requirements.

The conventional means for supporting a bank of tubes of this nature includes a pair of mutually complementary tube clamping blocks adapted for retaining the lines therebetween. One of the blocks is placed on one side of the bank of tubes and is secured to the structure of the airplane and the other block is located on the opposite side and is attached to the first block by means of bolts. It will be apparent that whenever events dictate the removal of one hydraulic line from the group, the conventional supporting means makes the release of all of the lines mandatory. Such a procedure is extremely undesirable because of the prohibitive amount of time involved, especially when the need for repairs necessitates frequent removal of one or more tubes. The time factor is of particular importance in military aircraft where the results of enemy action may require replacement of several hydraulic lines after each mission.

An important object of my invention therefore is the provision of a means for supporting adjacent hydraulic lines which permits individual and facile installation and removal of each line.

Another object of my invention is to provide a means of support which cushions the tube, dampens vibration thereof, and prevents direct contact with the supporting member.

A further object of the invention is to provide a supporting means having a positive and dependable locking action.

An additional object of the invention is the provision of a simple and inexpensive supporting means which is lighter than conventional devices and is adapted for convenient and facile assembly and removal.

The disclosure of a means for effecting a realization of these and other objectives of my invention may best be introduced by referring to the accompanying drawing, which is for illustrative purposes only, wherein:

Fig. 1 illustrates an application of my invention to a bank of adjacent, parallel hydraulic lines;

Fig. 2 is a sectional view taken along the line 2—2 of Fig. 1;

Fig. 3 is a perspective view of a supporting member forming one component of my invention;

Fig. 4 is a perspective view illustrating a method of inserting a cushioning member between the supporting member and a hydraulic line;

Fig. 5 is a view similar to Fig. 4 illustrating an assembled supporting means; and Fig. 6 is a sectional view of the supporting means taken along the line 6—6 of Fig. 2.

Referring to the drawing, the supporting means comprises a supporting member 10 adapted to retain a bank of hydraulic lines 20 by means of cushioning members 30. As best shown in Fig. 3, the supporting member 10 may be an angle section formed from a relatively thin sheet of material defining a pair of intersecting legs 11 and 12, the latter leg being provided with a circular opening 13 therethrough. The leg 12 is also provided with a slot 14 extending inwardly from the outer longitudinal edge 15 thereof to communicate with the opening 13 and defining a pair of inwardly-extending lips 16 between the periphery of the opening 13 and the edge 15. The slot 14 is of sufficient width to permit lateral insertion of the tube 20 therethrough into the opening 13, the latter being sufficiently larger than the tube 20 to permit insertion of the cushioning member 30 therein between the supporting member 10 and the tube 20. The leg 11 is preferably provided with holes 17 therethrough to permit attachment of the supporting member 10 to a section 18 (shown in phantom) of a supporting structure by means of rivets 19. It will be understood, of course, that my inventive concept is not limited to an angle section or the specific mode of attachment illustrated, since supporting members of various configurations may be employed and these may be secured to a suitable supporting structure by any appropriate means, as is well known in the art.

The cushioning member 30 is preferably a split annular grommet formed of a suitable flexible and resilient material such as rubber, neoprene, or the like, and having a longitudinal hole 31 therethrough to permit encirclement of the tube 20 thereby. The grommet 30 is provided with an annular groove 32 in the outer periphery thereof to define a pair of annular flanges 33 and 34 which are adapted to embrace the surfaces of the leg 12 in the vicinity of the opening 13 therethrough, as best shown in Fig. 6. The depth of the groove 32 is preferably such that the base thereof will engage the peripheral wall of the opening 13 snugly when the grommet 30 is inserted therein as will be described in detail. The grommet 30 is preferably provided with a radial slit 35 therethrough to permit sufficient deformation thereof for the grommet 30 to be inserted peripherally into the opening 13, as will be described hereinafter.

When assembly of the supporting means is desired, the tube 20 may be inserted transversely through the slot 14 and into the opening 13 in the supporting member 10, the latter being secured to a suitable structure, such as indicated by the numeral 18. The grommet 30 is then partially straightened and one of the ends thereof, which is formed by the slit 35, can be inserted through the slot 14 into the annular space between the hydraulic line 20 and the peripheral wall of the opening 13, the annular flanges 33 and 34 slidably engaging opposite surfaces of the leg 12 adjacent the opening 13. The inserted end of the grommet 30 can be urged through the annular space surrounding the tube 20 by a peripheral force applied thereto in substantially tangential relationship with the periphery of the line 20, as best shown by Fig. 4, until the entire grommet 30 is contained within the opening 13. Upon completion of the peripheral insertion process, the grommet 30 can be rotated about the tube 20 until the slit 35 is substantially opposite the slot 14, as indicated by Fig. 5, to eliminate any possibility of inadvertent withdrawal of the tube 20 from the hole 31 through the cushioning member 30, the latter being retained firmly within the opening 13 by the inwardly-extending lips 16 of the leg 12. The depth of the annular groove 32 in the grommet 30 is preferably sufficient to provide a frictional engaging surface between the flanges 33 and 34 and the leg 12 which is adequate to resist any rotative tendency of the grommet 30 which may be caused by vibration of the supporting member 10, although even if the grommet 30 rotates sufficiently to bring the slit 35 and slot 14 into registry, lateral withdrawal of the tube 20 would be virtually impossible, since the ends of the grommet 30 would be urged into engagement with the sides of the slot 14 and the tube 20 would become wedged between the ends of the grommet 30.

Whenever removal of the tube 20 is required, the cushioning means 30 may be rotated until the slit 35 is adjacent the slot 14 and may be removed by pulling an end thereof out through the slot 14, thereby releasing the tube 20 which may then be withdrawn laterally from the opening 13 without interfering with any adjacent lines.

I prefer to provide a peripherally-insertable cushioning means 30 rather than a means which is axially-insertable, i. e., insertable parallel to the longitudinal axis of the tube 20, in order to obtain a groove 32 of greater depth and consequently obtain greater engaging surfaces between the flanges 33 and 34 and the leg 12. Since appreciable deformation of one flange would be necessary to permit axial insertion into the opening 13, the diameter of at least one of the flanges 33 or 34 would necessarily be only slightly larger than the diameter of the annular base of the groove 32 to permit reasonably facile axial insertion. Peripheral insertion permits the employment of larger flange diameters and thereby guarantees a more positive engagement between the cushioning means 30 and the supporting member 10.

Since the cushioning means 30 is preferably formed of a suitable rubber-like material, the tube 20 is protected from any damage thereto which may result from direct contact with the supporting member 10, and any vibration of the latter is appreciably dampened before reaching the line 20. The invention provides a supporting means which is considerably lighter than the conventional clamping blocks and the simplicity thereof makes for inexpensive fabrication and assembly of the various components.

Although I have described a specific embodiment of my invention for the purpose of revealing the underlying inventive concept, I do not intend to be limited to the specific disclosures contained herein and am entitled to the protection offered by the full scope of my appended claims.

I claim as my invention:

1. In a device for supporting a hydraulic line, the combination of: a supporting member provided with an opening therethrough and having a transverse slot extending inwardly from an edge thereof to communicate with said opening, said slot being of sufficient size to permit lateral insertion of said hydraulic line therethrough into said opening; readily-removable, peripherally-insertable cushioning means disposed in said opening and adapted for engagement with said supporting member and said hydraulic line to removably retain said line in said opening, said cushioning means being insertable through said slot and into said opening by moving successive portions thereof substantially parallel to the periphery of said opening; and means for retaining said cushioning means in said opening.

2. In a device for supporting a hydraulic line, the combination of: a supporting member provided with an openings therethrough and having a transverse slot extending inwardly from an edge thereof to communicate with said opening, said slot being of sufficient size to permit lateral insertion of said hydraulic line therethrough into said opening and the opening being larger than said slot to define a pair of inwardly-extending lips between said edge and said opening; and a cushioning member, formed of a flexible and resilient material, disposed in said opening between said hydraulic line and said supporting member, said cushioning member having a hole therethrough which is adapted to receive said hydraulic line and being provided with an outer peripheral groove therein to define a pair of peripheral flanges which are adapted for engagement with said supporting member, said cushioning member having a slit extending inwardly from the periphery thereof to communicate with said hole whereby sufficient deformation of said cushioning member may be achieved to permit peripheral insertion thereof through said slot and into said opening between said hydraulic line and said supporting member.

3. In a device for supporting a plurality of adjacent hydraulic lines, the combination of: a supporting member provided with a plurality of slots extending inwardly from the periphery thereof and provided with a corresponding number of openings therethrough, one opening being disposed adjacent the inner end of and in communication with each slot, each of said slots being adapted to permit lateral insertion of a hydraulic line therethrough into the opening thereadjacent; and cushioning means disposed in each opening for retaining said hydraulic lines in said openings while permitting independent installation and removal of said lines, said cushioning means being insertable through said slots and into said openings by peripheral movement with respect to said hydraulic lines.

4. In a device of the character described, the combination of: a supporting member provided with an opening which extends inwardly from an edge thereof and which includes a restricted outer portion and an enlarged inner portion; and annular cushioning means adapted to engage said supporting member along substantially the entire periphery of said enlarged portion of said opening, said cushioning means being sufficiently deformable to permit insertion thereof into said enlarged portion of said opening through said restricted portion thereof.

ROBERT D. WEBER.

REFERENCES CITED

The following references are of record in the file of this patent:

UNITED STATES PATENTS

| Number | Name | Date |
| --- | --- | --- |
| 1,316,255 | Rauch | Sept. 16, 1919 |
| 1,334,545 | Londelius | Mar. 23, 1920 |
| 2,291,430 | Ingersoll | July 28, 1942 |
| 2,338,660 | Morehouse | Jan. 4, 1944 |

FOREIGN PATENTS

| Number | Country | Date |
| --- | --- | --- |
| 605,213 | Germany | Nov. 7, 1934 |